Figure 1:
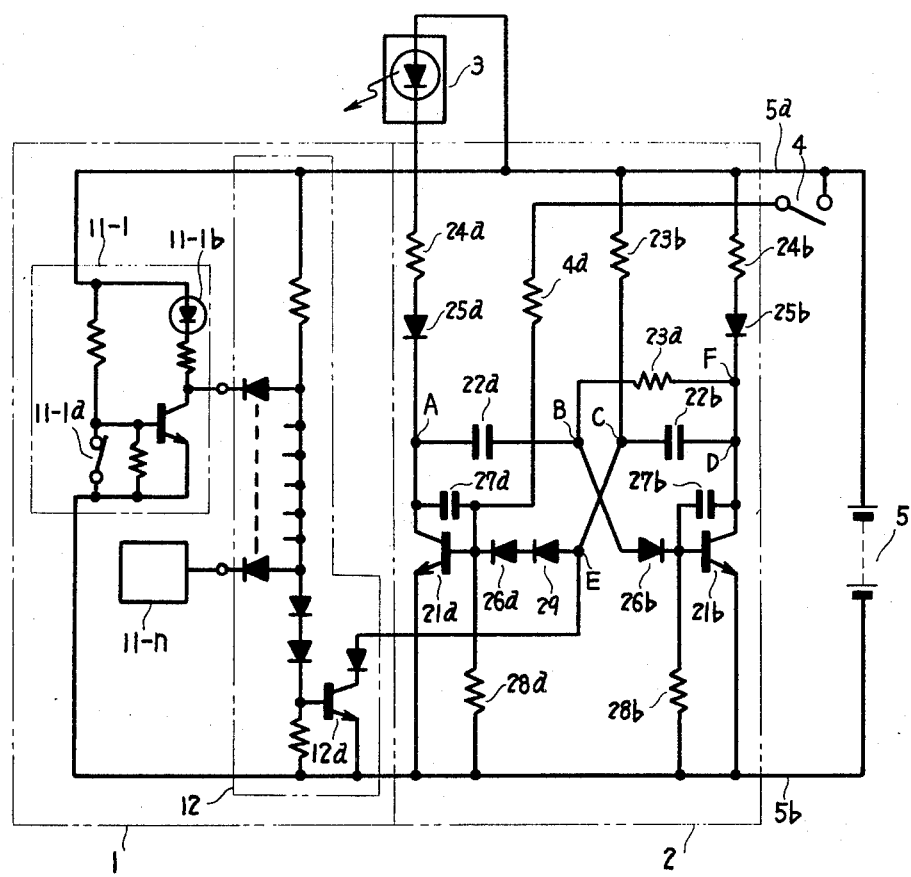

United States Patent [19]
Ohtake et al.

[11] 3,911,373
[45] Oct. 7, 1975

[54] OSCILLATION CONTROL CIRCUIT FOR VEHICLE WARNING SYSTEM

[75] Inventors: Toshikazu Ohtake, Okazaki; Koichi Taniguchi, Kariya; Tadashi Tsuda, Nagoya, all of Japan

[73] Assignee: Nippondenso Co., Ltd., Kariya, Japan

[22] Filed: July 8, 1974

[21] Appl. No.: 486,584

[30] Foreign Application Priority Data
Aug. 22, 1973 Japan.............................. 48-94094

[52] U.S. Cl.............. 331/65; 331/113 R; 340/52 F; 340/366 B
[51] Int. Cl.²...................... G08B 5/38; H03K 3/282
[58] Field of Search............ 331/65, 66, 113 R, 145; 340/52 R, 52 F, 366 B

[56] References Cited
UNITED STATES PATENTS

| | | | |
|---|---|---|---|
| 3,039,065 | 6/1962 | Regis................................ | 331/113 R |
| 3,060,386 | 10/1962 | Cerofolini....................... | 331/113 R |
| 3,188,623 | 6/1965 | Culbertson.................. | 331/113 R X |

*Primary Examiner*—Siegfried H. Grimm
*Attorney, Agent, or Firm*—Cushman, Darby & Cushman

[57] ABSTRACT

An oscillation control circuit comprises an astable multivibrator, a display means such as a light emitting diode which is connected to and controlled by the astable multivibrator to flash when an abnormal vehicle condition is present, and a switching circuit which disables the oscillation of the astable multivibrator when no abnormal vehicle condition is present.

6 Claims, 2 Drawing Figures

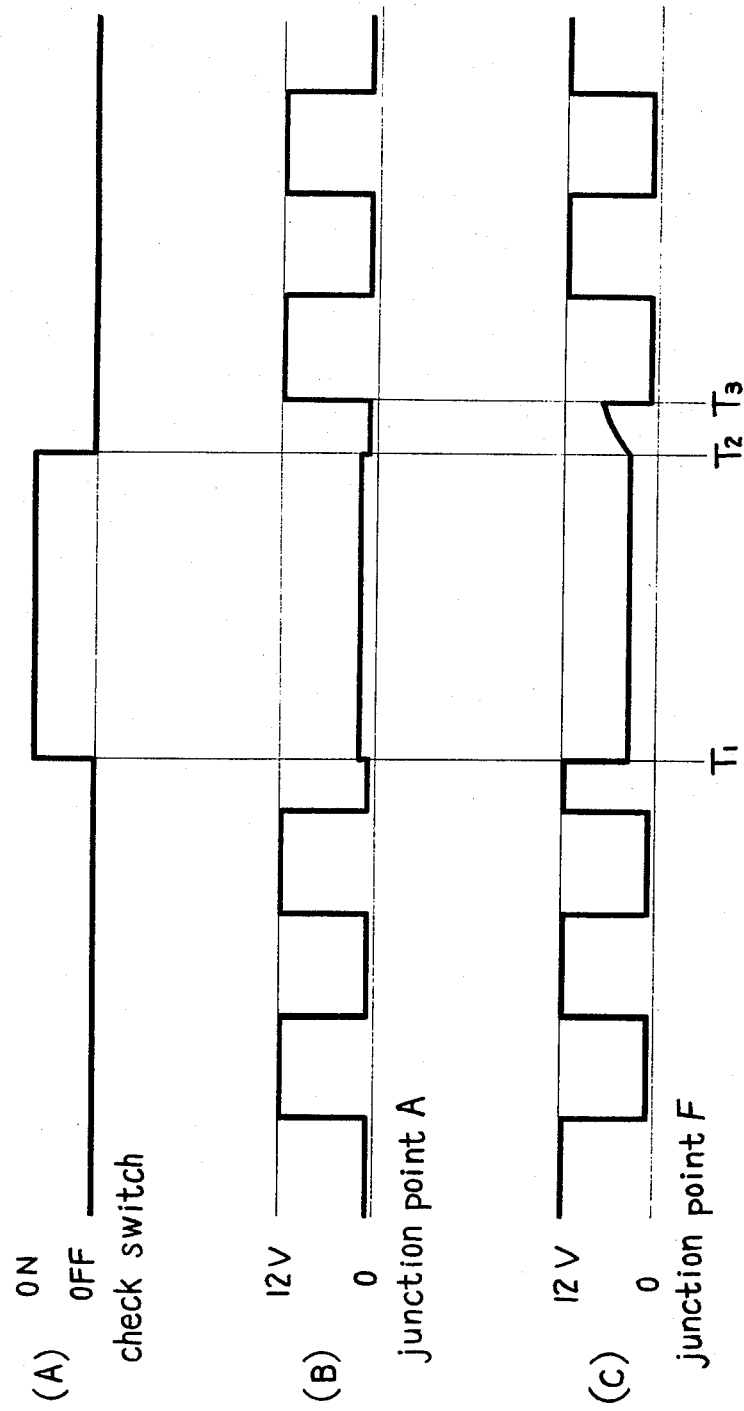

100
OSCILLATION CONTROL CIRCUIT FOR VEHICLE WARNING SYSTEM

This invention relates to an oscillation control circuit which comprises an astable multivibrator and a display means for a warning apparatus for vehicles, in which inspections of parts and functions responsible for safe operation of the vehicle are carried out prior to the running of the vehicle or during the running thereof.

It is accordingly a primary object of the present invention to provide an oscillation control circuit which stops its oscillation when no display is necessary, whereby useless oscillation thereof is eliminated.

It is another object of the present invention to provide an oscillation control circuit which restarts its oscillation immediately after any accidental conditions for stopping its oscillation are removed.

It is a further object of the present invention to provide an oscillation control circuit which carries out a stable oscillation without being influenced by noise voltages.

These and other objects and many of the attendant advantages of the present invention will be readily appreciated as the same becomes better understood by reference to the following detailed description when considered in connection with the accompanying drawings, in which FIG. 1 is an electric wiring diagram embodying the present invention, and FIG. 2 is a schematic diagram illustrating the operation of the present invention.

Referring now to FIG. 1, a gate circuit 1 detects an abnormal state of the portions to be inspected. The gate circuit comprises a plurality of abnormality discriminating circuits 11-1 to 11-n which are provided with a sensor 11-1a respectively mounted to portions of the vehicle to be inspected to detect an abnormal or disordered state of the portion, for example, a liquid gauge sensor mounted to the fluid reservoir of the brake master cylinder to detect the quantity of brake fluid and with a display unit 11-1b operative upon receiving an output signal from said sensor 11-1a, such display units being for example, a light emitting diode, a lamp or luminous element, or an acoustic mechanism. A NAND gate 12 constituting a switching circuit drives a transistor 12a into cut-off state when at least one of said plurality of abnormality discriminating circuits 11-1 to 11-n produces an abnormal signal of "0" level. Consequently, the transistor 12a is conductive only when all of said abnormality discriminating circuits produce a normal signal of "1" level. An astable multivibrator 2 comprises a pair of transistors 21a and 21b, a pair of capacitors 22a and 22b respectively connected to the transistors 21a and 21b, time constant resistors 23a and 23b, resistors 24a, 24b, 28a and 28b, voltage compensation diodes 25a and 25b for compensating the oscillation of the astable multivibrator 2 during rapid reduction of a power supply voltage thereto, a pair of diodes 26a and 26b for improving breakdown voltage of each transistor 21a and 21b, capacitors 27a and 27b for absorbing impulsive noise voltages applied to each base of the transistors 21a and 21b in order to prevent the misconduction thereof, and a diode 29 for compensating the conduction level of the transistor 21a when the a stable multivibrator 2 ceases its oscillation because of an abnormal input signal turning off transistor 12a and thereby cutting off the output signal from the NAND gate 12. A normally opened check switch 4 is provided for checking an operation of a light emitting diode 3 which constitutes display means. Numeral 4a is a resistor, 5 a power source comprising a battery, 5a a positive line for supplying an electric current from the battery 5 to the electric circuits and 5b a negative line. Numerals A, B, C, D, E and F respectively designate junction points.

The operation will now be described with reference to FIG. 1. At first when all of the abnormality discriminating circuits 11-1 to 11-n produce normal signals of 1 level, namely all of the portions to be inspected are not disordered, the transistor 12a is driven into the saturation state, the junction point E is grounded to the negative line 5b and thereby the transistor 21a is driven into the cut-off state.

At this instance, an electric current from the battery 5 flows through the diode 3, junction point A, the capacitor 22a, the junction point B, the diode 26b and the base of the transistor 21b. However capacitor 22a is soon fully charged so that the junction point A becomes positive and no more electric current flows. At the same time, the base of the transistor 21b is supplied with an electric current from the battery 5 through the resistor 24b, the diode 25b, the resistor 23a the junction point B and the diode 26b to make the transistor 21b conductive. Accordingly the astable multivibrator 2 is prevented from oscillation thereof and the light emitting diode 3 is not operated due to no electric current flowing therethrough. The astable multivibrator cannot stop with both transistors 21a and 21b conductive because resistor 23a is connected between the base and emitter of transistor 27b which accordingly is forced into its non-conductive state.

Next, when at least one of said abnormality discriminating circuits 11-1 to 11-n produces an abnormal signal of 0 level, namely one of the portions to be inspected becomes disordered the transistor 12a is driven into the cut-off state, and thereby the transistor 21a is driven into saturation due to a base current thereof through the resistor 23b, the junction points C and E and the diodes 29 and 26a. At this instance the junction point A is grounded to the negative line 5b because of the saturation of the transistor 21a, and subsequently the potential of the junction point B is forced to be negative. Accordingly the transistor 21b is driven into nonconduction, thereby to start the oscillation of the astable multivibrator 2. In this state of conduction of the transistor 21a and nonconduction of the transistor 21b, the capacitor 22a is charged by an electric current flowing through the resistor 24b, the diode 25b, the resistor 23a, the junction point B, the capacitor 22a and the junction point A. As the result, the electric potential of the junction point B becomes sufficiently high to make the transistor 21b conductive. The capacitor 22b has been also charged by an electric current flowing through the resistor 24b, the diode 25b, the capacitor 22b, the junction point C and the diodes 29 and 26a. When the transistor 21b is driven into conduction due to the sufficient high potential at the junction point B, the transistor 21a is driven into the cut-off state since the potential at the junction point C becomes negative due to short-circuit of the junction point D to the negative line 5b. In this state where the transistor 21a is in the cut-off state and the transistor 21b is conductive, the capacitors 22a and 22b are oppositely charged, in other words the capacitor 22a is charged by the diode 3, electric current flowing through the resistor 24a, the diode 25a, the capacitor 22a and the diode 26b and the capacitor 22b is charged by the electric current flowing through the resistor 23b, the junction point C, the capacitor 22b, the junction point D and the transistor 21b. After a few seconds have passed, the electric potential at the junction point C becomes sufficiently high enough to make the transistor 21a conductive. Thus, the astable multivibrator continues to oscillate, repeating the above described operation. The light emitting diode 3 performs an ON-OFF operation in response to the oscillation of the multivibrator, whereby a driver of the vehicle can notice that at least one certain portion to be inspected is disordered, and further the driver can easily find out where it is by looking at the display means 11-1b to 11-1n.

Next referring to FIG. 2, when the check switch 4 is closed at a time T1, the base of the transistor 21a is continuously supplied with the electric current from the battery 5 through the check switch 4 and the resistor 4a in order to make the transistor 21a continuously conductive, whereby the light emitting diode 3 continues to emit light. In this state, since the transistor 21b is in the unsaturated range, the electric potential of about 3 volt appears at the junction point F as shown in FIG. 2(C). On the contrary, at the junction point A appears almost zero level, or about 0.3 volt, electric potential due to the saturation of the transistor 21a. When the check switch 4 is opened at a time T2, the potential at the junction point A is decreased a little as shown in FIG. 2(B), due to the fact that when the overdriving current to the base of the transistor 21a through the check switch 4, is changed to the saturation current thereto, the collector voltage is decreased by a certain degree. The transistor 21b is forced to go to the cut-off state subsequently causing decrease of the potential at the junction point A, whereby the potential at the junction point F increases as shown in FIG. 2(C) during the time T2 to a time T3. Since the capacitor 22a which has not been charged in the opposite direction is soon charged, the base of the transistor 21b is soon supplied with sufficient electric current through the resistor 23a, the junction point B and the diode 26b to make it conductive at the time T3. The potential at the junction point D is rapidly decreased to almost the zero level because of conduction of the transistor 21b resulting in the appearance of the negative voltage at the junction point C, thereby to make the transistor 21a cut-off at the time T3, and finally the astable multivibrator restarts to oscillate, immediately, for example, 0.3 millisecond after the check switch 4 is opened.

In the circuit when the supply voltage to the astable multivibrator 2 is accidentally decreased rapidly, since the diodes 25a and 25b are provided to prevent the reverse current flowing from capacitor 22a or 22b to the battery 5, after the supply voltage returns to the normal level, the astable multivibrator smoothly begins to oscillate again.

The diodes 26a and 26b maintain a sufficient threshold voltage of the transistor so that the astable multivibrator 2 performs an astable operation even when noise voltage comes from the NAND gate 12.

Since the capacitors 27a and 27b are respectively connected between the collector and the base of the transistors 21a and 21b, the oscillation frequency of the multivibrator 2 is kept free from variation even when the noise voltages are applied to the bases of the transistors 21a and 21b.

What we claim is:

1. An oscillation control circuit comprising:
    a power source having a positive and negative terminal;
    a positive and negative power supply line respectively connected with said positive and negative terminal and
    an astable multivibrator connected to said positive and negative power supply line, wherein said astable multivibrator comprises:
    first and second transistors each having base, emitter and collector electrodes;
    means connecting the collector-emitter path of said first transistor across said positive and negative power supply line through a first collector resistor;
    means connecting the collector-emitter path of said second transistor across said positive and negative power supply line through a second collector resistor;
    a first capacitor connected between the base of said first transistor and the collector of said second transistor;
    a second capacitor connected between the base of said second transistor and the collector of said first transistor;
    a first base circuit including a first time constant resistor and connected between the base of said first transistor and one of said power supply line;
    a second base circuit including a second time constant resistor and connected between the base of said second transistor and the collector of said second transistor, whereby stopping of the oscillating operation of said multivibrator causes said second transistor to become non-conductive.

2. An oscillation control circuit as set forth in claim 1 further comprising:
    a display means connected in series with said collector-emitter path of said first transistor, whereby said display means operates to emit in response to ON-state of said first transistor.

3. An oscillation control circuit as set forth in claim 2 further comprising:
    a switch means connected between the base of said first transistor and said positive power supply line, whereby said first transistor is forcedly driven into the conduction state by the closure of said switch means.

4. An oscillation control circuit as set forth in claim 1 further comprising:
    a first and second collector-diode respectively connected to said collector-emitter paths of said first and second transistor in a forward conduction direction.

5. An oscillation control circuit as set forth in claim 1 further comprising:
    a first and second base-diode respectively connected to said first and second base circuit in a forward conduction direction.

6. An oscillation control circuit as set forth in claim 1 further comprising:
    at least one sensor circuit including a sensor mounted on a portion to be inspected and for generating an "0" signal when said portion is disordered;
    a logic circuit including an output transistor and connected to said sensor circuit, the collector-emitter path of said output transistor being connected to the base of said first transistor, and said output transistor being driven into a nonconduction state when said logic circuit receives said 0 signal, whereby the base current from said positive power supply line is supplied to the base of said first transistor.

* * * * *